US009019353B2

(12) United States Patent
Jeong et al.

(10) Patent No.: US 9,019,353 B2
(45) Date of Patent: Apr. 28, 2015

(54) 2D/3D SWITCHABLE IMAGE DISPLAY APPARATUS AND METHOD OF DISPLAYING 2D AND 3D IMAGES

(75) Inventors: Geun-Young Jeong, Yongin (KR); Seung-Kyu Lee, Yongin (KR); Jong-Woong Park, Yongin (KR); Joo-Hyung Lee, Yongin (KR); Ji-Yeon Yang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 597 days.

(21) Appl. No.: 13/053,743

(22) Filed: Mar. 22, 2011

(65) Prior Publication Data

US 2012/0146994 A1      Jun. 14, 2012

(30) Foreign Application Priority Data

Dec. 14, 2010   (KR) .................. 10-2010-0127854

(51) Int. Cl.
*H04N 13/04*        (2006.01)
*G09G 3/00*         (2006.01)

(52) U.S. Cl.
CPC ....... *H04N 13/0454* (2013.01); *H04N 13/0497* (2013.01); *H04N 13/0404* (2013.01); *H04N 13/0409* (2013.01); *G09G 3/003* (2013.01); *G09G 2310/0205* (2013.01)

(58) Field of Classification Search
CPC .......... G09G 2310/0205; G09G 3/003; H04N 13/0404; H04N 13/0409; H04N 13/0454; H04N 13/0497

USPC .......................................... 348/51
See application file for complete search history.

(56) References Cited

U.S. PATENT DOCUMENTS

| 2004/0008170 | A1* | 1/2004 | Makino et al. ............... 345/87 |
| 2005/0225630 | A1 | 10/2005 | Childers et al. |
| 2007/0069978 | A1* | 3/2007 | Daiku .................. 345/8 |
| 2007/0242068 | A1* | 10/2007 | Han et al. ............... 345/427 |
| 2008/0151040 | A1 | 6/2008 | Kim |
| 2010/0039428 | A1 | 2/2010 | Kim et al. |

FOREIGN PATENT DOCUMENTS

| JP | 2007-531473 | 11/2007 |
| KR | 10-2008-0059937 | 7/2008 |
| KR | 10-2008-0105873 | 12/2008 |
| KR | 10-2010-0021905 | 2/2010 |

\* cited by examiner

*Primary Examiner* — Anner Holder
(74) *Attorney, Agent, or Firm* — Robert E. Bushnell, Esq.

(57) ABSTRACT

In a two-dimensional/three-dimensional (2D/3D) switchable image display apparatus and a method of displaying 2D and 3D images, the 2D/3D switchable image display apparatus may comprise: a data driver which outputs column data of an input image; a scan driver which controls a driving method of a plurality of odd scan lines and a plurality of even scan lines according to an input method and a display mode of the input image; a display panel which displays a 2D image or a 3D image by separately displaying the input image in odd lines and even lines; and a parallax device which generates binocular parallax between an image displayed in the odd lines and an image displayed in the even lines.

16 Claims, 11 Drawing Sheets

2D/3D SWITCHABLE IMAGE DISPLAY APPARATUS AND METHOD OF DISPLAYING 2D AND 3D IMAGES

CLAIM OF PRIORITY

This application makes reference to, incorporates the same herein, and claims all benefits accruing under 35 U.S.C. §119 from an application earlier filed in the Korean Intellectual Property Office on the 14 Dec. 2010 and there duly assigned Serial No. 10-2010-0127854.

BACKGROUND OF THE INVENTION

1. Field of the Invention

The present invention relates to a two-dimensional/three-dimensional (2D/3D) switchable image display apparatus and a method of displaying 2D and 3D images.

2. Description of the Related Art

Three-dimensional (3D) image display apparatuses for supporting 3D images have recently been developed to make displayed images look more realistic.

In general, a person's two eyes are spaced apart from each other by about 6.5 cm. Accordingly, when a person sees an object, both eyes obtain slightly different views of the object. A difference in location of the object seen by the left and right eyes is referred to as disparity. The disparity is synthesized in the brain and is perceived as a stereoscopic image. A 3D image is displayed based on this principle. For example, when both eyes see a hexahedral object, the brain detects a similar part between views of the hexahedral object from both eyes, and exploits parallax due to the different views from the eyes so as to gain depth perception and estimate a distance between both eyes and the hexahedral object.

In a conventional method of displaying a 3D image, a left-eye image (left image) and a right-eye image (right image) are separately formed during a content development step and are synthesized to generate stereoscopic image data, and then the left image and the right image are repeatedly provided to a stereoscopic image display apparatus. The stereoscopic image display apparatus requires a separate device for performing an intermediate process of synthesizing the left image and the right image. Since the separate device should exist as an algorithm in an integrated circuit (IC) or a host processor, the separate device increases an area and computing resources, thereby incurring additional mechanical and electrical costs. Also, the stereoscopic image display apparatus requires an additional device such as a memory for temporarily storing the left-eye image or the right-eye image, and a processor for performing 3D or 2D image processing. Furthermore, since the stereoscopic image display apparatus should repeatedly input the left and right images, the data input/output speed and power consumption of an interface are increased relative to input information.

SUMMARY OF THE INVENTION

The present invention provides a two-dimensional/three-dimensional (2D/3D) switchable image display apparatus which efficiently displays 2D and 3D images without having to perform a complex process.

According to an aspect of the present invention, a two-dimensional/three-dimensional (2D/3D) switchable image display apparatus comprises: a data driver which outputs column data of an input image; a scan driver which controls a driving method of a plurality of odd scan lines and a plurality of even scan lines according to an input method and a display mode of the input image; a display panel which displays a 2D image or a 3D image by separately displaying the input image in odd lines and even lines; and a parallax device which generates binocular parallax between an image displayed in the odd lines and an image displayed in the even lines.

The data driver may sequentially output the column data of the input image in an order in which the input image is inputted. The column data may include odd column data or even column data.

The scan driver separately or sequentially drives the plurality of odd scan lines and the plurality of even scan lines according to an image input method in order to display a 3D image, and simultaneously drives the plurality of odd scan lines and the plurality of even scan lines in order to display a 2D image.

If a left image frame and a right image frame are alternately inputted, the scan driver separately drives the plurality of odd scan lines and the plurality of even scan lines in order to display a 3D image, and if column data of a left image and column data of a right image are alternately inputted, the scan driver alternately sequentially drives the plurality of odd scan lines and the plurality of even scan lines in order to display a 3D image.

The scan driver may alternately sequentially drive the plurality of odd scan lines and the plurality of even scan lines in order to display a 2D image in a state where the parallax device is turned off.

The parallax device may include a parallax barrier and a lenticular lens.

The 2D/3D switchable image display apparatus may further include a signal control unit which identifies an input method of the input image and outputs a control signal for controlling a driving method of the scan lines.

The 2D/3D switchable image display apparatus may further include a frame memory which, if the signal control unit operates in a CPU mode, stores column data of the input image in odd lines addressed to odd numbers and even lines addressed to even numbers, according to an input method of the input image.

If a left image frame and a right image frame are alternately inputted, the frame memory separately stores the left image frame and the right image frame in the odd lines or the even lines in order to display a 3D image, and if column data of a left image and column data of a right image are alternately input, the frame memory alternately sequentially stores the column data of the left image and the column data of the right image in the odd lines and the even lines in order to display a 3D image.

The 2D/3D switchable image display apparatus may further include a parallax device control unit which controls the parallax device to be turned on or off.

According to another aspect of the present invention, a 2D/3D switchable image display apparatus comprises: a data driver which outputs column data of each image in an order in which a left-eye image and a right-eye image are inputted; a scan driver which separately drives a plurality of odd scan lines and a plurality of even scan lines; a display panel which separately displays the left-eye image and the right-eye image in odd lines and even lines to display a 3D image; and a parallax device which generates binocular parallax between the left-eye image and the right-eye image.

According to another aspect of the present invention, a 2D/3D switchable image display apparatus comprises: a data driver which sequentially outputs column data of an input image; a scan driver which simultaneously drives a plurality of odd scan lines and a plurality of even scan lines; a display panel which simultaneously displays the column data in odd lines and even lines to display a 2D image; and a parallax device which generates binocular parallax between an image displayed in the odd lines and an image displayed in the even lines.

According to another aspect of the present invention, a method of displaying 2D and 3D images comprises the steps of: determining an input method and a display method of an input image; sequentially applying column data of the input image, and controlling a driving method of a plurality of odd scan lines and a plurality of even scan lines according to the input method and the display mode of the input image; and generating binocular parallax between images separately displayed in odd lines and even lines to display a 2D image or a 3D image.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
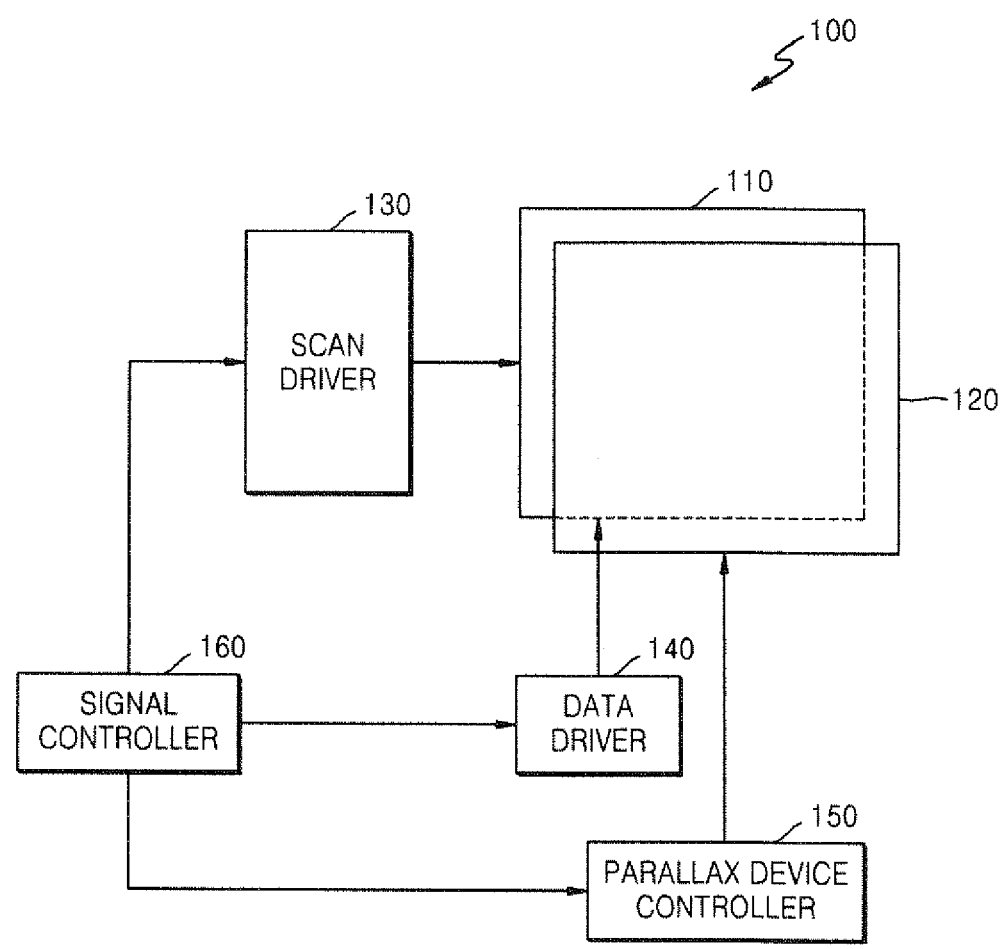
FIG. 1 is a block diagram of a two-dimensional/three-dimensional (2D/3D) switchable image display apparatus according to an embodiment of the present invention.

The present invention will now be described more fully with reference to the accompanying drawings, in which exemplary embodiments of the invention are shown. In the drawings, the same reference numerals denote the same elements. When publicly known techniques or structures related to the present invention may unnecessarily make the present invention unclear, detailed descriptions will be omitted. Also, in the drawings, the thicknesses of layers and regions are exaggerated for clarity.

FIG. 1 is a block diagram of a two-dimensional/three-dimensional (2D/3D) switchable image display apparatus 100 according to an embodiment of the present invention.

Referring to FIG. 1, the 2D/3D switchable image display apparatus 100 includes a display panel 110, a parallax device 120, a source driving unit 130, a data driver 140, a parallax device controller 150, and a signal controller 160.

The display panel 110 includes a plurality of N scan lines extending in a first direction and a plurality of M data lines extending in a second direction intersecting the first direction, and a plurality of M×N pixels disposed at intersections of the N scan lines and the M data lines. Examples of the display panel 110 include various types of display panels such as an organic light-emitting display panel, a liquid crystal display (LCD) panel, and a field emission display (FED) panel.

The plurality of N scan lines on the display panel includes N/2 odd scan lines and N/2 even scan lines. The N scan lines may be in a single scan scheme or a dual scan scheme.

In order to prevent resolution from decreasing to ½ when an image is spatially divided into a left image and a right image, the display panel 110 may include a plurality of 2N scan lines, a plurality of M data lines, and a plurality of M×2N pixels disposed at intersections between the 2N scan lines and the M data lines so as to achieve a double resolution.

Hereinafter, the display panel 110 including M×N pixels is referred to as the display panel 110 with a general resolution, and the display panel 110 including M×2N pixels is referred to as the display panel 110 with a double resolution.

The display panel 110 displays a 2D image or a 3D image by separately displaying an input image in odd lines and even lines.

The parallax device 120 separately displays a left image and a right image, and generates binocular parallax between an image displayed by the odd lines of the display panel 110 and an image displayed by the even lines of the display panel 110. The parallax device 120 includes a unit for generating binocular parallax, such as a parallax barrier or a lenticular lens. The parallax device 120 may be switched on or off according to a driving mode of the display panel 110. If the display panel 110 operates in a 3D mode, the parallax device 120 may be turned on, and if the display panel 110 operates in a 2D mode, the parallax device 120 may be turned on or off. A method of displaying a 3D image by using the parallax device 120 is illustrated in FIGS. 2 and 3.

Figure 2:
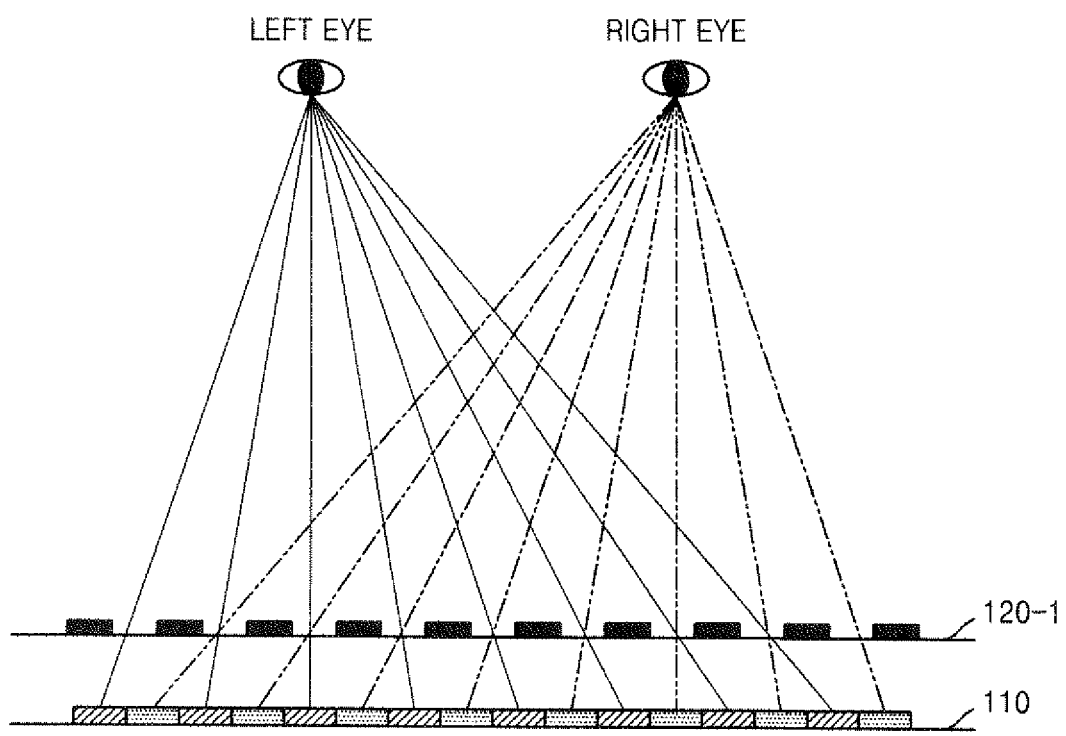
FIG. 2 illustrates a method of displaying a 3D image by using a parallax barrier.
Figure 3:
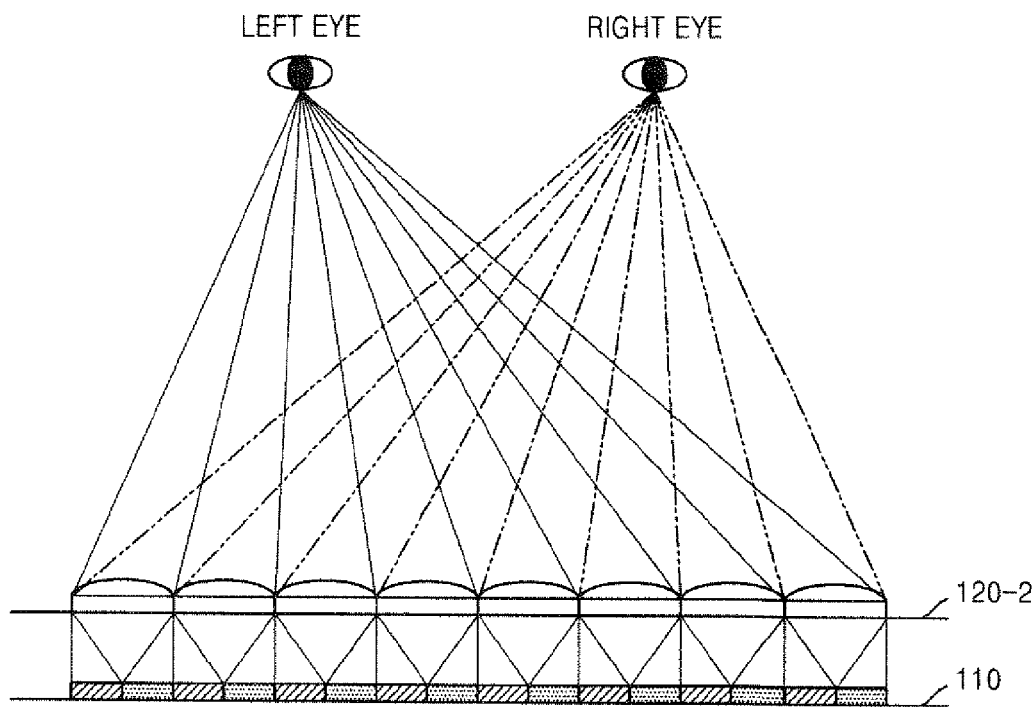
FIG. 3 illustrates a method of displaying a 3D image by using a lenticular lens array.

FIG. 2 illustrates a method of displaying a 3D image by using a parallax barrier; and FIG. 3 illustrates a method of displaying a 3D image by using a lenticular lens array.

Referring to FIG. 2, the parallax barrier 120-1 in which vertical slits for transmitting or blocking light are arranged at regular intervals is located in front of the display panel 110. The method using the parallax barrier 120-1 generates binocular parallax by separating a left image and a right image through the slits of the parallax barrier 120-1.

Referring to FIG. 3, the lenticular lens array 120-2 in which a plurality of semi-cylindrical lenticular lenses are arranged is provided on the display panel 110. The method using the lenticular lens array 120-2 generates binocular parallax by separating a left image and a right image by focusing a transmission path of each pixel point on a left eye and a right eye.

FIGS. 2 and 3 are respectively the same as a conventional method using a parallax barrier and a conventional method using a lenticular lens, and thus a detailed explanation thereof will not be given.

The scan driver 130 of FIG. 1 may generate and sequentially provide gate signals, including a combination of a gate-on voltage of an active level and a gate-off voltage of an inactive level, to the display panel 110 through the plurality of scan lines. The scan driver 130 outputs odd gate signals Godd for driving odd scan lines, and even gate signals Geven for driving even scan lines.

Figure 4:
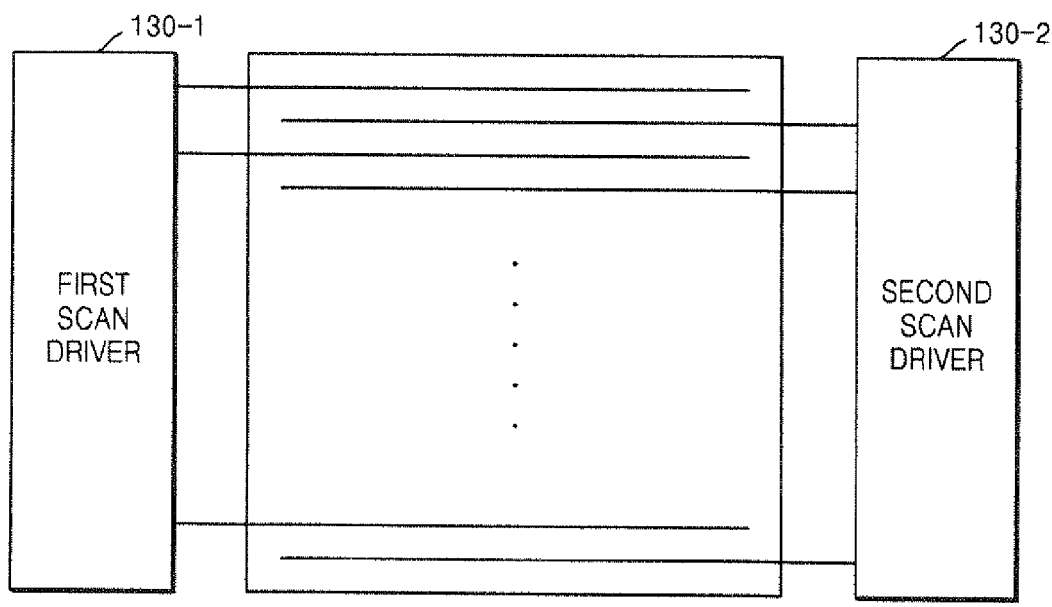
FIG. 4 is a block diagram of a scan driver of the 3D/2D switchable image display apparatus of FIG. 1 when scan lines are in a dual scan scheme.

FIG. 4 is a block diagram of the scan driver of the 2D/3D switchable image display apparatus of FIG. 1 when scan lines are in a dual scan scheme.

Referring to FIG. 4, the scan driver 130 may include a first scan driver 130-1 which is connected to odd scan lines and provides odd gate signals Godd to the odd scan lines, and a second scan driver 130-2 which is connected to even scan lines and provides even gate signals Geven to the even scan lines.

In a state where the parallax device 120 of FIG. 1 is turned on, in order to drive the 2D/3D switchable image display apparatus 100 in a 3D mode, the first scan driver 130-1 first drives the odd scan lines, and then the second scan driver 130-2 drives the even scan lines. Alternatively, the second scan driver 130-2 may first drive the even scan lines, and then the first scan driver 130-1 may drive the odd scan lines. In a state where the parallax device 120 is turned on, in order to drive the 2D/3D switchable image display apparatus 100 in a 2D mode, the first scan driver 130-1 and the second scan driver 130-2 simultaneously drive the odd scan lines and the even scan lines, respectively.

The data driver 140 provides image data to the display panel 110 through the plurality of data lines. In a 3D mode, the display panel 110 displays a 3D image in which a left image and a right image with parallax therebetween are perceived, and in a 2D mode, the display panel 110 displays a 2D image in which the same image is perceived by the left eye and the right eye.

The scan driver 130 and the data driver 140 may be directly formed on a lower substrate of the display panel 110 in an amorphous silicon gate (ASG) method, or may be separately manufactured and mounted on the lower substrate in a chip on board (COB) method, a tape automated bonding (TAB) method, or a chip on glass (COG) method.

The parallax device controller 150 controls the parallax device 120 so as to be turned on or off according to a control signal output from the signal controller 160.

The signal controller 160 controls a driving method of the display panel 110 by controlling the scan driver 130, the data driver 140, and the parallax device controller 150 according to an input method and a display mode.

Figure 5:
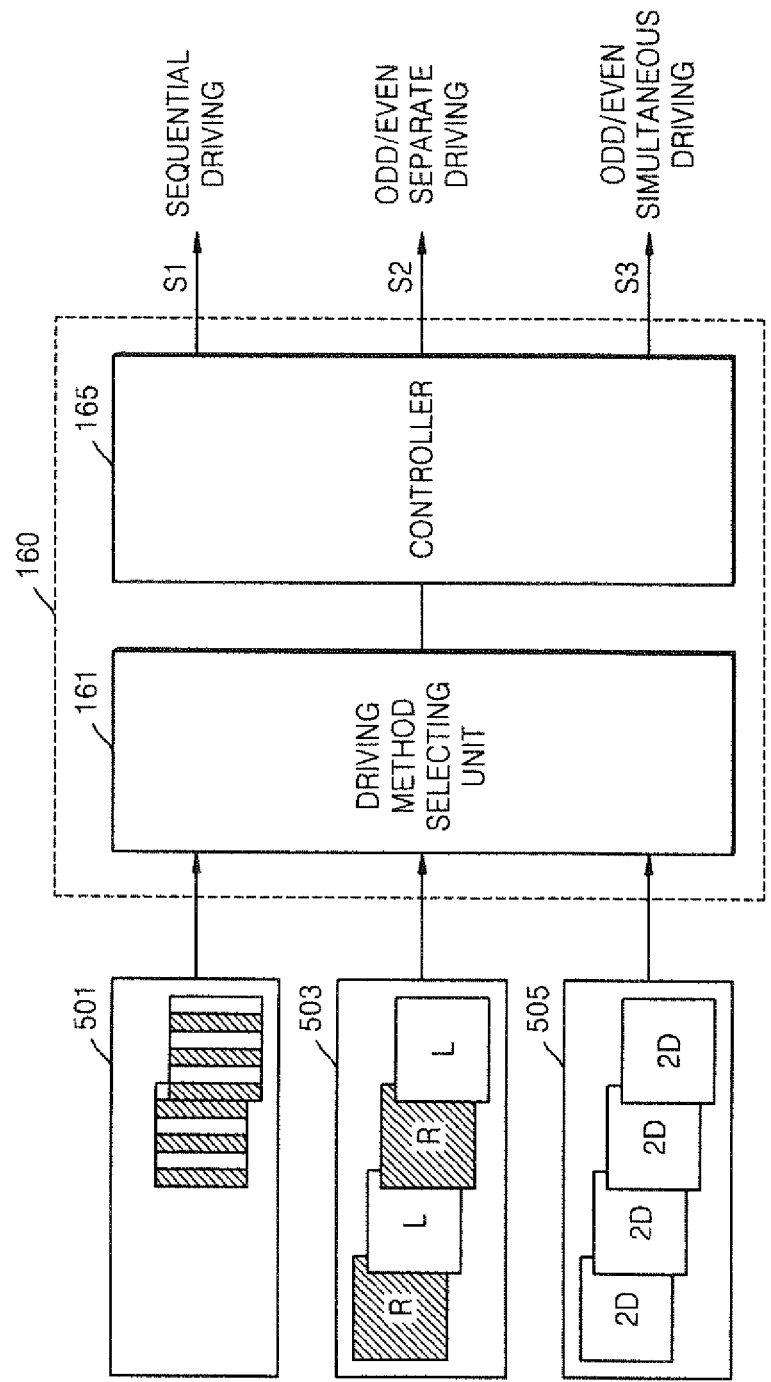
FIG. 5 is a block diagram of a signal control unit of the 2D/3D switchable image display apparatus of FIG. 1.

FIG. 5 is a block diagram of a signal controller of the 2D/3D switchable image display apparatus of FIG. 1.

Referring to FIG. 5, the signal controller 160 includes a driving method selecting unit 161 and a control unit 165.

The driving method selecting unit 161 determines whether a mode is a 2D mode in which a 2D image is displayed or a 3D mode in which a 3D image is displayed. The driving method selecting unit 161 determines an input method of an input image if the mode is a 3D mode. The driving method selecting unit 161 determines a driving method of scan lines based on the determined input method and display mode of the input image.

A series of images inputted to display a 3D image may be inputted using an interleaved method 501 or a frame sequential method 503. The interleaved method is a method in which a left image and a right image are alternately arranged in units of columns, and column data of the left image and column data of the right image are alternately inputted. The frame sequential method 503 is a method in which a left image frame and a right image frame corresponding to each other are alternately inputted. A series of images inputted to display a 2D image may be the left image or the right image.

Examples of a driving method may include a sequential driving method, an odd/even separate driving method, and an odd/even simultaneous driving method. The sequential driving method is a method of alternately sequentially driving odd scan lines and even scan lines. The sequential driving method may be used when an image is inputted in the interleaved method 501 so as to display a 3D image, or when a 2D image is displayed in a state where the parallax device is turned off. The odd/even separate driving method is a method of first driving odd scan lines or even scan lines, and then driving the even scan lines or the odd scan lines. The odd/even separate driving method may be used when an image is inputted in the frame sequential method 503 to display a 3D image. The odd/even simultaneous driving method is a method of simultaneously driving one odd scan line and even scan line pair. The odd/even simultaneous driving method may be used when an input image is a 2D image 505.

The control unit 165 generates a control signal S1, S2, or S3 according to a selected driving method, and outputs the control signal S1, S2, or S3 to the scan driver 130, the data driver 140, and the parallax device controller 150.

The signal controller 160 is driven while in a central processing unit (CPU) mode or a red/green/blue (RGB) mode. Here, the RGB mode is a mode in which an image is displayed by using image data R, G, and B generated from a graphic controller of a system board. The image data R, G, and B generated from the graphic controller are synchronized with a vertical sync signal Vsync, a horizontal sync signal Hsync, a main clock MCLK, and a data enable signal DE, and are transmitted to the signal controller 160 through a data bus. The CPU mode is a mode in which an image is displayed by using image data R, G, and B stored in a frame memory of a system board. The image data R, G, and B from the frame memory are synchronized with a chip select (CS) signal and a register select (RS) signal, and are transmitted to the signal controller 160 through a data bus. The signal controller 160 may operate in the RGB mode or the CPU mode.

Figure 6:
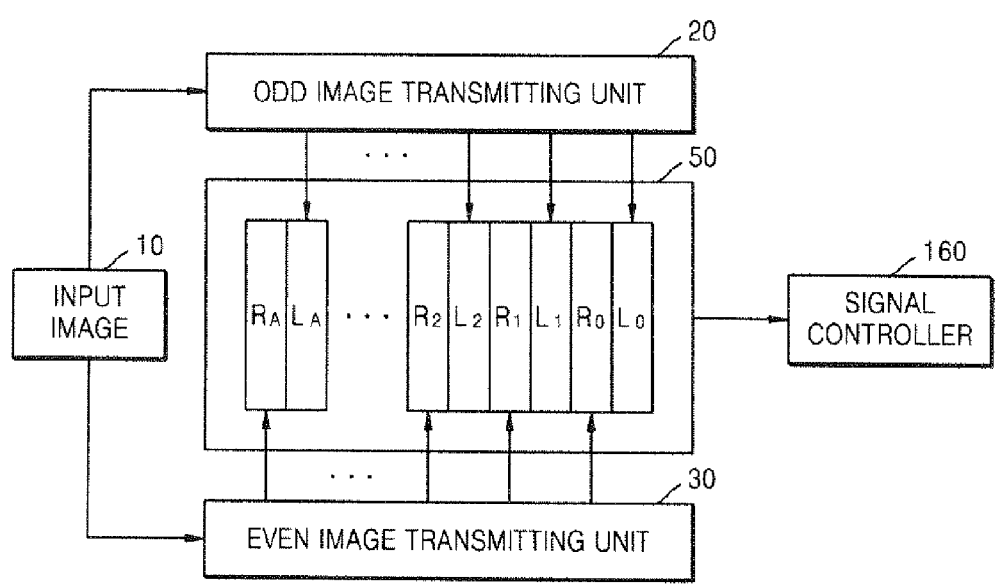
FIG. 6 is a block diagram illustrating image data stored in a frame memory when the signal control unit of the 2D/3D switchable image display apparatus of FIG. 1 operates in a central processing unit (CPU) mode.

FIG. 6 is a block diagram illustrating image data stored in a frame memory when the signal control unit of the 2D/3D switchable image display apparatus of FIG. 1 operates in a central processing unit (CPU) mode.

Referring to FIG. 6, when an input image 10, which is a 2D image or a 3D image, is recorded on the frame memory 50, memory addresses of image data are separately set to odd lines L0, L1, L2, ..., LA or even lines R0, R1, R2, ..., RA. The image data of the input image 10 are individually selectively stored in the odd lines L0, L1, L2, ..., LA or the even lines R0, R1, R2, ..., RA through an odd image transmitting unit 20 and an even image transmitting unit 30.

For example, if an image is inputted while an interleaved method is being performed, column data of the input image is sequentially stored by sequentially alternately enabling odd lines and even lines of the frame memory 50. If an image is inputted while a frame sequential method is being performed, column data of a left image or a right image which is first inputted are first stored by enabling odd lines or even lines of the frame memory 50, and then column data of the right image or the left image which is subsequently inputted are stored by enabling the even lines or the odd lines, thereby storing an image in which the left and right images are alternately combined. Meanwhile, if an input image is a 2D image and the parallax device 120 is turned on, the same image is viewed from the left eye and the right eye by storing the same column data in one odd line and even line pair of the frame memory 50. If an input image is a 2D image and the parallax device 120 is turned off, column data are sequentially stored in odd lines and even lines of the frame memory 50. In this case, the signal controller 160 sequentially reads out image data of the odd lines L0, L1, L2, . . . , LA or the even lines R0, R1, R2, . . . , RA of the frame memory 50, and displays a 3D image or a 2D image on the display panel 110.

Alternatively, the signal controller 160 reads out image data of the odd lines L0, L1, L2, . . . , LA or the even lines R0, R1, R2, . . . , RA of the frame memory 50, and displays a 3D image or a 2D image on the display panel 110. The signal controller 160 sequentially reads out image data of the odd lines L0, L1, L2, . . . , LA or the even lines R0, R1, R2, . . . , RA and displays a 3D image in a sequential driving method. If image data of the odd lines L0, L1, L2, . . . , LA and the even lines R0, R1, R2, . . . , RA are the same, a 2D image may be displayed by performing a sequential driving or an odd/even simultaneous driving method. Alternatively, the signal controller 160 may first read out image data of the odd lines L0, L1, L2, . . . , LA and then may read out image data of the even lines R0, R1, R2, . . . , RA, and display a 3D image in an odd/even separate driving method.

Figure 7A:
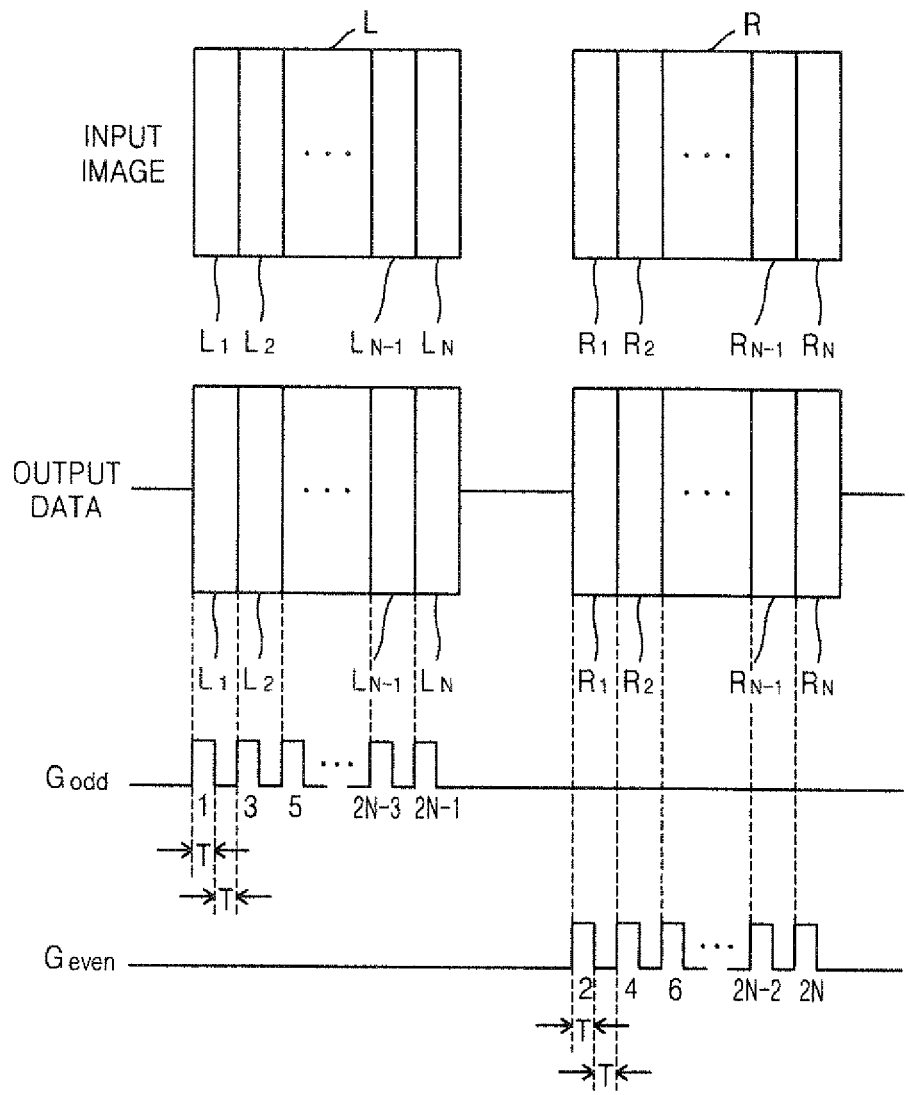
FIGS. 7A and 7B illustrate a 3D image displayed on a display panel with a double resolution according to an embodiment of the present invention.
Figure 7B:
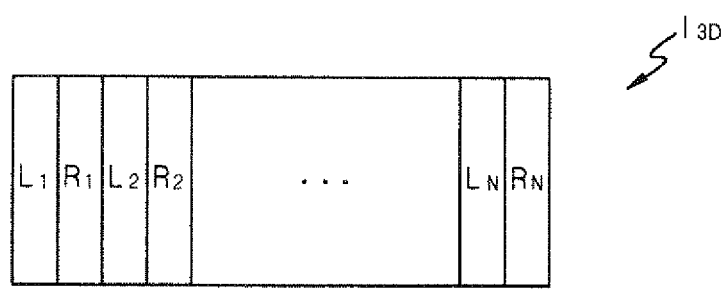

FIGS. 7A and 7B illustrate a 3D image displayed on a display panel with a double resolution according to an embodiment of the present invention.

Referring to FIG. 7A, a left image L consisting of column data L1, L2, . . . , LN and a right image R consisting of column data R1, R2, . . . , RN are sequentially inputted to the signal controller 160.

The data driver 140 sequentially outputs column data of images in an order in which the images are inputted. That is, the column data L1, L2, . . . , LN of the left image L are first outputted, and the column data R1, R2, . . . , RN of the right image R are subsequently outputted after a predetermined time interval.

The scan driver 130 operates in an odd/even separate driving method. The scan driver 130 sequentially outputs odd gate signals Godd in N odd (1, 3, 5, . . . , 2N−3, and 2N−1) scan lines, and then sequentially outputs even gate signals Geven to N even (2, 4, 6, . . . , 2N−2, and 2N) scan lines. The odd gate signals Godd are sequentially outputted at time intervals T, and the even gate signals Geven are sequentially outputted at time intervals T. Data signals are applied to pixels that are turned on by the gate signals. Here, T is a gate on time.

Referring to FIG. 7B, the column data L1, L2, . . . , LN of the left image L are applied to pixels of odd lines due to the odd gate signals Godd, and the column data R1, R2, . . . , RN of the right image R are applied to pixels of even lines due to the even gate signals Geven. Accordingly, the column data L1, L2, . . . , LN of the left image L and the column data R1, R2, . . . , RN of the right image R are respectively perceived by the left eye and the right eye through the parallax device 120, and thus the display panel 110 with a double resolution displays a 3D image $I_{3D}$.

Here, the data driver 140 may first output the right image R, and then the left image L. The scan driver 130 may sequentially output the even gate signals Geven to the even (2, 4, 6, . . . , 2N−2, and 2N) scan lines, and then sequentially output the odd gate signals Godd to the odd (1, 3, 5, . . . , 2N−3, and 2N−1) scan lines.

Figure 8A:
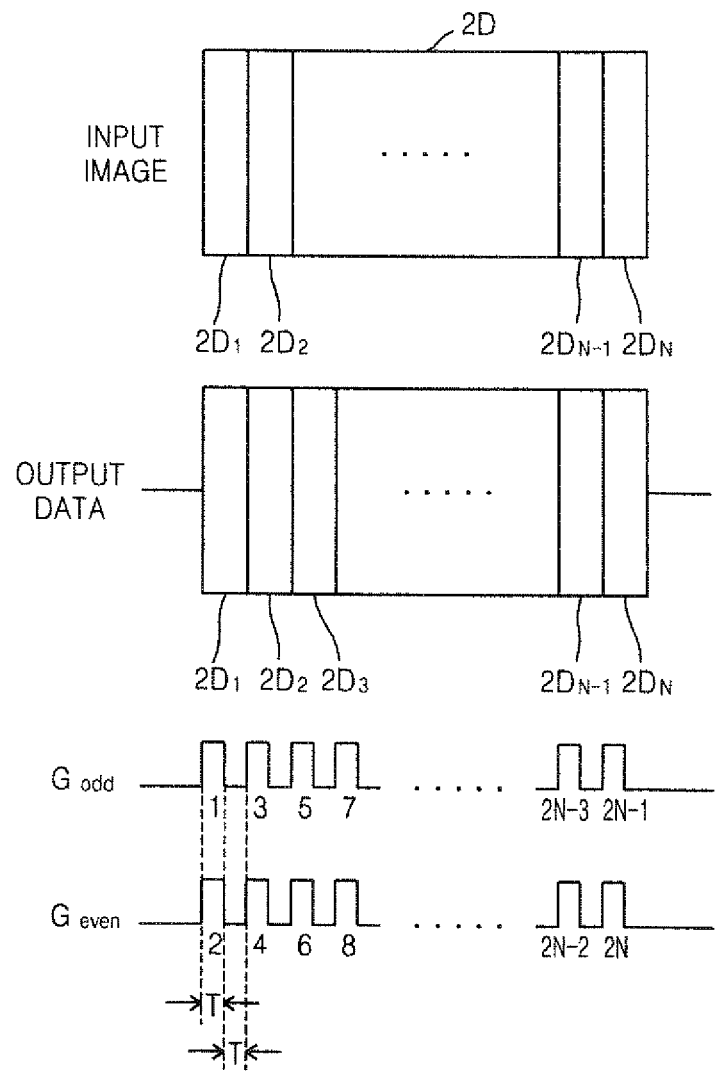
FIGS. 8A and 8B illustrate a 2D image displayed on the display panel with a double resolution according to an embodiment of the present invention.
Figure 8B:
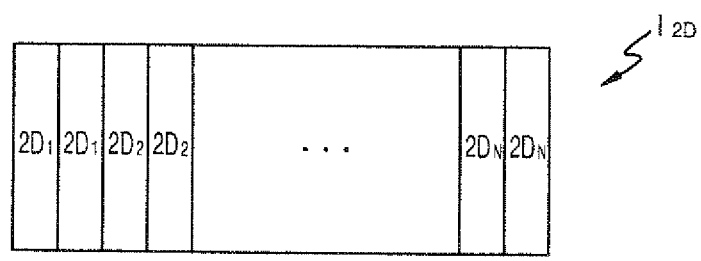

FIGS. 8A and 8B illustrate a 2D image displayed on the display panel with a double resolution according to an embodiment of the present invention.

Referring to FIG. 8A, a 2D image 2D consisting of column data 2D1, 2D2, . . . , 2DN is inputted to the signal controller 160. The 2D image 2D may be a left image L or a right image R.

The data driver 140 sequentially outputs column data of an image in an order in which the image is inputted. That is, the data driver 140 sequentially outputs N column data 2D1, 2D2, . . . , 2DN of the 2D image 2D.

The scan driver 130 operates in an odd/even simultaneous driving method. The scan driver 130 sequentially outputs odd gate signals Godd to N odd (1, 3, 5, . . . , 2N−3, and 2N−1) scan lines, and at the same time sequentially outputs even gate signals Geven to N even (2, 4, 6, . . . , 2N−2, and 2N) scan lines. The odd gate signals Godd are sequentially outputted at time intervals T, and the even gate signals Geven are sequentially outputted at time intervals T. Here, T is a gate on time.

Referring to FIG. 8B, the N column data 2D1, 2D2, . . . , 2DN are applied to pixels of odd lines due to the odd gate signals Godd, and at the same time, the N column data 2D1, 2D2, . . . , 2DN are applied to pixels of even lines due to the even gate signals Geven. Since data applied to the pixels of the odd lines and the pixels of the even lines are the same, the same image is perceived by the left eye and the right eye, and thus the display panel 110 with a double resolution displays a 2D image 12D. In this case, the 2D image 12D is perceived at a resolution which is the same as that of an initial input image. Here, if the parallax device 120 is turned off, since the same data is applied to the pixels of the odd lines and the pixels of the even lines, the 2D image 12D is perceived at a resolution that is the same as that of an initial input image. That is, since the odd scan lines and the even scan lines are simultaneously driven, the display panel 110 with a double resolution may be driven with an input image with one time resolution, thereby reducing power consumption and operation speed.

Figure 9A:
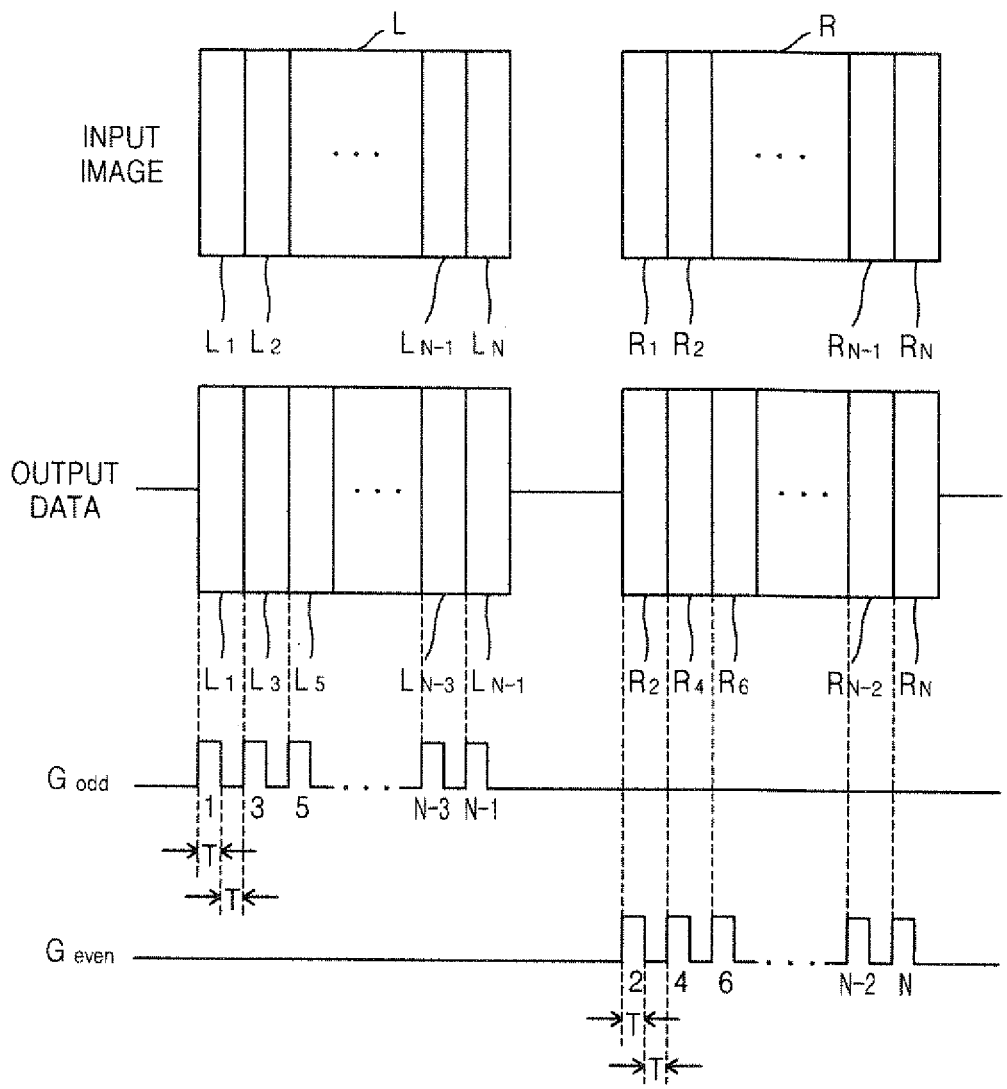
FIGS. 9A and 9B illustrate a 3D image displayed on the display panel with a general resolution according to an embodiment of the present invention.
Figure 9B:
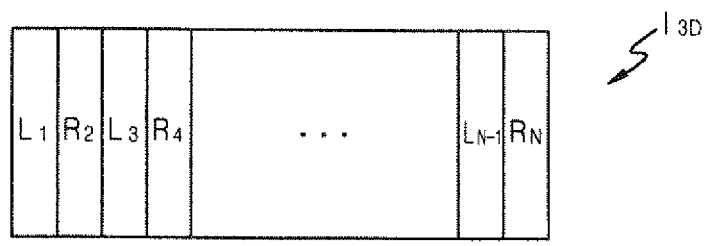

FIGS. 9A and 9B illustrate a 3D image displayed on the display panel with a general resolution according to an embodiment of the present invention.

Referring to FIG. 9A, a left image L consisting of column data L1, L2, . . . , LN and a right image R consisting of column data R1, R2, . . . , RN are sequentially inputted to the signal control unit 160.

The data driver 140 sequentially outputs column data of images in an order in which the images are inputted. That is, the data driver 140 first outputs the odd column data L1, L3, . . . , LN−1 of the left image L and then outputs the even column data R2, R4, . . . , RN of the right image R.

The scan driver 130 operates in an odd/even separate driving method. The scan driver 130 first sequentially outputs odd gate signals Godd to odd (1, 3, 5, . . . , N−3, and N−1) scan lines, and then sequentially outputs even gate signals Geven to even (2, 4, 6, . . . , N−2, and N) scan lines. The odd gate signals Godd are sequentially outputted at time intervals T, and the even gate signals Geven are sequentially outputted at time intervals T. Here, T is a gate on time. Data signal are applied to pixels which are turned on by the gate signals.

Referring to FIG. 9B, the odd column data L1, L3, . . . , LN−1 of the left image L are applied to pixels of odd lines due to the odd gate signals Godd, and the even column data R2, R4, . . . , RN of the right image R are applied to pixels of even lines due to the even gate signals Geven. Accordingly, the odd column data L1, L3, . . . , LN−1 of the left image L and the even column data R2, R4, . . . , RN of the right image R are respectively perceived by the left eye and the right eye through the parallax device 120, and thus the display panel 110 with a general resolution displays a 3D image $I_{3D}$.

Here, the data driver 140 may first output the odd column data R1, R3, . . . , RN−1 of the right image R, and then output the even column data L2, L4, . . . , LN of the left eye L. The scan driver 130 may first output the even gate signals Geven to the even (2, 4, . . . , N−2, and N) scan lines, and then sequentially output the odd gate signals Godd to the odd (1, 3, 5, ..., N−3, and N−1) scan lines.

Figure 10A:
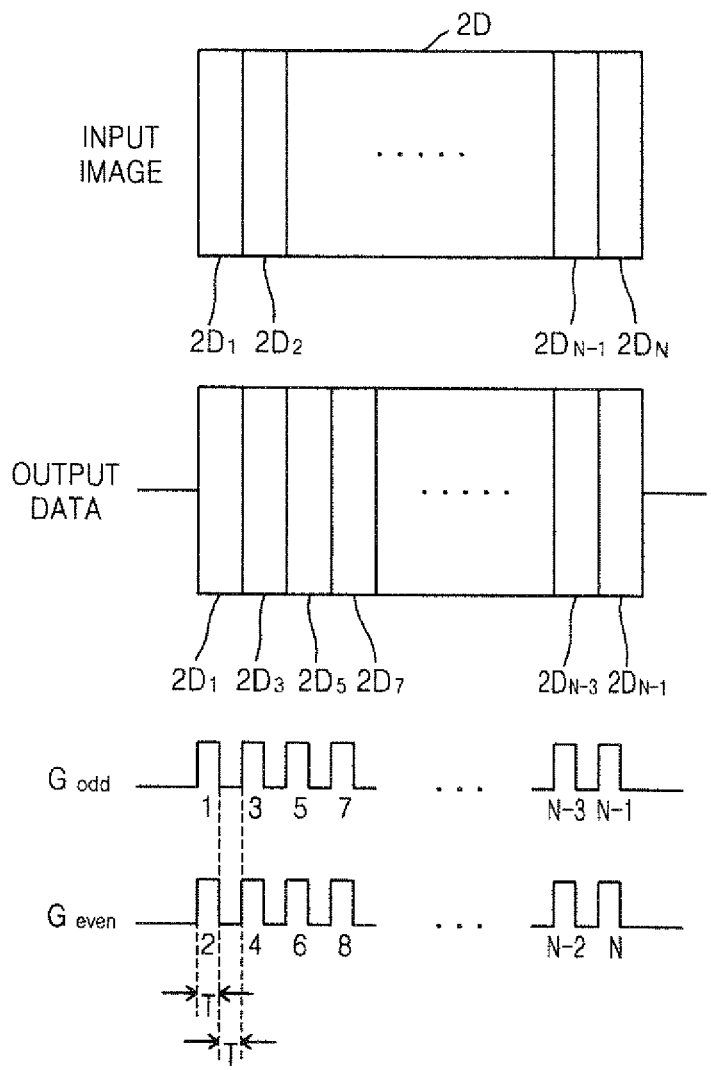
FIGS. 10A and 10B illustrate a 2D image displayed on the display panel with a general resolution according to an embodiment of the present invention.
Figure 10B:
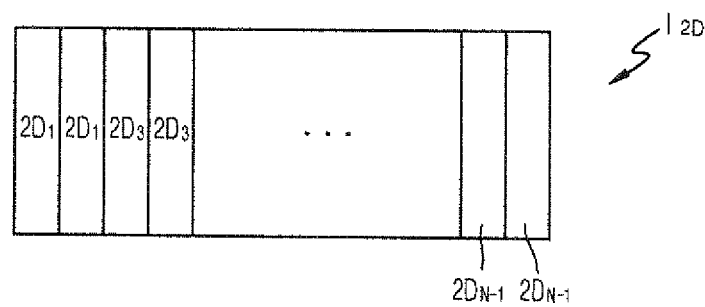

FIGS. 10A and 10B illustrate a 2D image displayed on the display panel with a general resolution according to an embodiment of the present invention.

Referring to FIG. 10A, a 2D image 2D consisting of column data 2D1, 2D2, ..., 2DN is input to the signal controller 160. The 2D image 2D may be a left image L or a right image R.

The data driver 140 sequentially outputs column data of an image in an order in which the image is input. That is, the data driver 140 sequentially outputs odd column data 2D1, 2D3, ..., 2DN−1 or even column data 2D2, 2D4, ..., 2DN of the 2D image 2D. FIG. 10A illustrates an example where the odd column data 2D1, 2D3, ..., 2DN−1 are sequentially input.

The scan driver 130 operates in an odd/even simultaneous driving method. The scan driver 130 sequentially outputs odd gate signals Godd to odd (1, 3, 5, ..., N−3, and N−1) scan lines, and at the same time sequentially outputs even gate signals Geven to even (2, 4, 6, ..., N−2, and N) scan lines. The odd gate signals Godd are sequentially output at time intervals T, and the even gate signals Geven are sequentially output at time intervals T. Here, T is a gate on time. Data signals are applied to pixels that are turned on by the gate signals.

Referring to FIG. 10B, the odd column data 2D1, 2D3, ..., 2DN−1 are applied to pixels of odd lines due to the odd gate signals Godd, and the same odd column data 2D1, 2D3, ..., 2DN−1 are applied to pixels of even lines due to the even gate signals Geven. Since data output to the pixels of the odd lines and the pixels of the even lines are the same, the same image is perceived by the left eye and the right eye, and thus the display panel 110 with a general resolution displays a 2D image 12D. The 2D image 12D is perceived in a state where a resolution is reduced to ½.

Figure 11A:
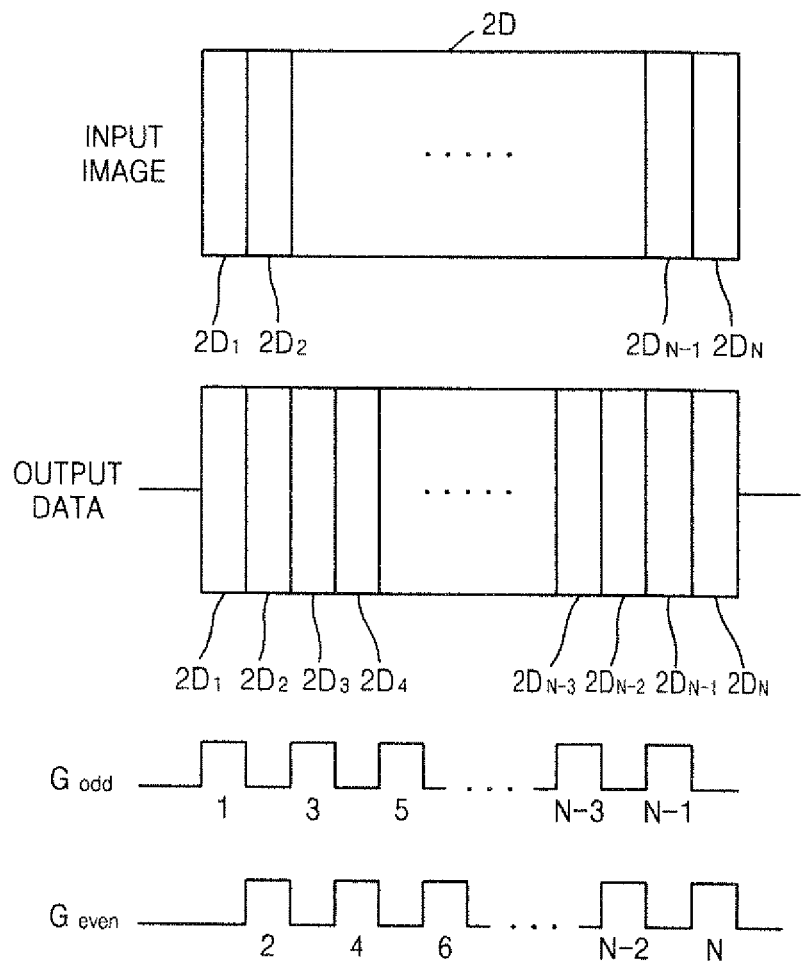
FIGS. 11A and 11B illustrate a 2D image displayed on the display panel with a general resolution according to an embodiment of the present invention.
Figure 11B:
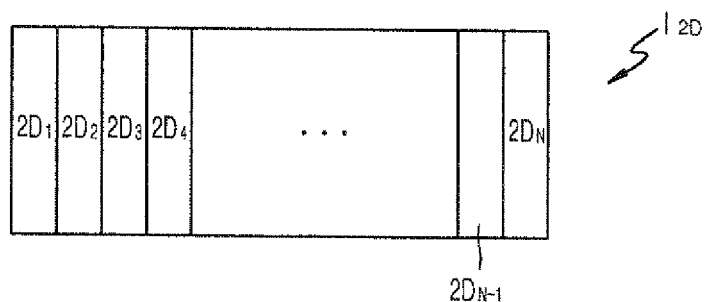

FIGS. 11A and 11B illustrate a 2D image displayed on the display panel with a general resolution according to an embodiment of the present invention.

In FIGS. 11A and 11B, a 2D image is displayed in a state where the parallax device 120 is turned off.

Referring to FIG. 11A, a 2D image 2D consisting of column data 2D1, 2D2, ..., 2DN is inputted to the signal controller 160. The 2D image 2D may be a left image L or a right image R.

The data driver 140 sequentially outputs column data of an image in an order in which the image is inputted. That is, the data driver 140 sequentially outputs N column data 2D1, 2D2, ..., 2DN of the 2D image 2D.

The scan driver 130 operates in a sequential driving method. The scan driver 130 alternately sequentially outputs odd gate signals Godd to odd (1, 3, 5, ..., 2N−3, and 2N−1) scan lines, and even gate signals Geven to even (2, 4, 6, ..., 2N−2, and 2N) scan lines.

Referring to FIG. 11, N column data 2D1, 2D2, ..., 2DN are sequentially applied to pixels of odd lines and pixels of even lines due to the odd gate signals Godd and the even gate signals Geven. In this case, since the parallax device 120 is in an off state, a 2D image with no binocular parallax 12D is perceived. Since the display panel 110 with a general resolution has a data rate which is ½ that of the display panel 110 with a double resolution, the display panel 110 with a general resolution may be sequentially driven with less data processing and power consumption.

Figure 12:
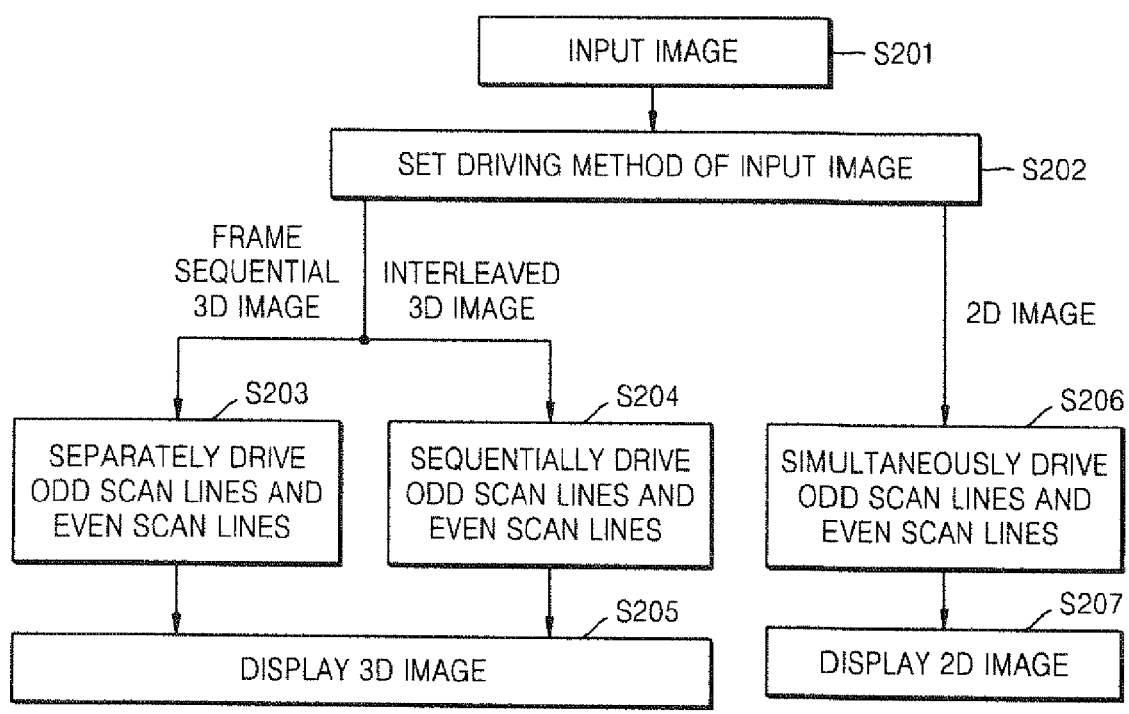
FIG. 12 is a flowchart illustrating a method of displaying a 3D image and a 2D image according to an embodiment of the present invention.

FIG. 12 is a flowchart illustrating a method of displaying a 3D image and a 2D image according to an embodiment of the present invention.

Referring to FIG. 12, a 2D/3D switchable image display apparatus receives an image in operation S201, and sets a driving method of scan lines according to an input method and a display mode in operation S202.

The 2D/3D switchable image display apparatus sequentially applies column data of input images in an order in which the input images are inputted, and controls a driving method of a plurality of odd scan lines and a plurality of even scan lines according to an input method and a display mode.

If an input image is inputted in units of frames, that is, if an input image is a 3D image in which a left image frame and a right image frame are alternately inputted, odd scan lines and even scan lines are separately driven in operation S203, and a 3D image is displayed in operation S205.

If an input image is inputted in units of columns, that is, if an input image is a 3D image in which column data of a left image and column data of a right image are alternately inputted, odd scan lines and even scan lines are sequentially driven in operation S204, and a 3D image is displayed in operation S205.

If an input image is a 2D image, odd scan lines and even scan lines are simultaneously driven in operation S206, and a 2D image is displayed in operation S207.

Meanwhile, if the parallax device 120 is turned off, a 2D image may be displayed by sequentially driving odd scan lines and even scan lines. The display panel 110 with a general resolution uses only even column data or odd column data of an image.

The 2D/3D switchable image display apparatus according to the present invention may display a 3D image and a 2D image by separately or simultaneously driving odd scan lines and even scan lines without synthesizing a left image and a right image. Also, the 2D/3D switchable image display apparatus according to the present invention may selectively drive a 3D image or a 2D image by changing a control signal of scan lines, without adding or changing hardware.

As described above, the 2D/3D switchable image display apparatus according to the present invention may perform image processing in real time and save costs since the 2D/3D switchable image display apparatus may be easily applied to various interface environments without adding or changing hardware.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A two-dimensional/three-dimensional (2D/3D) switchable image display apparatus, comprising:
   a data driver which outputs column data of an input image;
   a scan driver which controls a driving method of a plurality of odd scan lines and a plurality of even scan lines by using one of a separate driving method, a sequential driving method and a simultaneous driving method according to an input method and a display mode of the input image;
   a display panel which displays one of a 2D image and a 3D image by separately displaying the input image in odd lines and even lines; and
   a parallax device which generates binocular parallax between an image displayed in the odd lines and an image displayed in the even lines,
   wherein the input method comprises an interleaved method and a frame sequential method and the display mode comprises a 3D display mode and a 2D display mode, and wherein the scan driver drives the plurality of odd scan lines and the plurality of even scan lines in one of the separate driving method and the sequential driving method in order to display a 3D image, and the scan driver drives the plurality of odd scan lines and the plurality of even scan lines in the simultaneous driving method in order to display a 2D image.

2. The 2D/3D switchable image display apparatus of claim 1, wherein the data driver sequentially outputs one of odd column data and even column data inputted alternatively.

3. The 2D/3D switchable image display apparatus of claim 1, wherein the data driver sequentially outputs all odd column data and then all even column data, or sequentially outputs all even column data and then all odd column data.

4. The 2D/3D switchable image display apparatus of claim 1, wherein if the input method is a frame sequential method in which a left image frame and a right image frame are alternately inputted, the scan driver separately drives the plurality of odd scan lines and the plurality of even scan lines in order to display a 3D image, and wherein, if the input method is an interleaved method in which column data of a left image and column data of a right image are alternately inputted, the scan driver alternately sequentially drives the plurality of odd scan lines and the plurality of even scan lines in order to display a 3D image.

5. The 2D/3D switchable image display apparatus of claim 1, wherein the scan driver alternately sequentially drives the plurality of odd scan lines and the plurality of even scan lines in order to display a 2D image in a state where the parallax device is turned off.

6. The 2D/3D switchable image display apparatus of claim 1, wherein the parallax device comprises a parallax barrier and a lenticular lens.

7. The 2D/3D switchable image display apparatus of claim 1, further comprising a signal control unit which identifies an input method of the input image and outputs a control signal for controlling a driving method of the scan lines.

8. The 2D/3D switchable image display apparatus of claim 7, further comprising a frame memory which, if the signal control unit operates in a CPU mode, stores column data of the input image in odd lines addressed to odd numbers and even lines addressed to even numbers according to an input method of the input image.

9. The 2D/3D switchable image display apparatus of claim 8, wherein if a left image frame and a right image frame are alternately inputted, the frame memory separately stores the left image frame and the right image frame in one of the odd lines and the even lines in order to display a 3D image, and wherein, if column data of a left image and column data of a right image are alternately inputted, the frame memory alternately sequentially stores the column data of the left image and the column data of the right image in the odd lines and the even lines in order to display a 3D image.

10. The 2D/3D switchable image display apparatus of claim 1, further comprising a parallax device control unit which controls the parallax device to be turned on and off.

11. A method of displaying 2D and 3D images, the method comprising the steps of:
determining an input method and a display mode of an input image;
sequentially applying column data of the input image;
controlling a driving method of a plurality of odd scan lines and a plurality of even scan lines by using one of a separate driving method, a sequential driving method and a simultaneous driving method according to the input method and the display mode of the input image; and
generating binocular parallax between images separately displayed in odd lines and even lines to display one of a 2D image and a 3D image,
wherein the input method comprises an interleaved method and a frame sequential method and the display mode comprises a 3D display mode and a 2D display mode, and
wherein the controlling of the driving method of the scan lines comprises driving the plurality of odd scan lines and the plurality of even scan lines in one of the sequential driving method and the sequential driving method in order to display a 3D image, and driving the plurality of odd scan lines and the plurality of even scan lines in the simultaneous driving method in order to display a 2D image.

12. The method of claim 11, wherein the step of sequentially applying the column data of the input image comprises applying one of odd column data and even column data alternatively.

13. The method of claim 11, wherein the step of sequentially applying the column data comprises applying all odd column data and then all even column data, or applying all even column data and then all odd column data.

14. The method of claim 11, wherein the controlling of the driving method of the scan lines comprises, if the input method is the frame sequential method in which a left image frame and a right image frame are alternately inputted, outputting a control signal to drive the plurality of scan lines and the plurality of even scan lines by using the separate driving method to display a 3D image.

15. The method of claim 11, wherein the controlling of the driving method of the scan lines comprises, if the input method is the interleaved method in which column data of a left image and column data of a right image are alternately inputted, outputting a control signal to sequentially drive the plurality of odd scan lines 3D image.

16. The method of claim 11, wherein the controlling of the driving method of the scan lines comprises outputting a control signal to simultaneously drive the plurality of odd scan lines and the plurality of even scan lines by using the simultaneous driving method to display a 2D image.

* * * * *